(12) United States Patent
Feng et al.

(10) Patent No.: US 10,712,829 B2
(45) Date of Patent: Jul. 14, 2020

(54) HANDWRITING BOARD AND CONTROL METHOD THEREOF

(71) Applicants: BOE TECHNOLOGY GROUP CO., LTD., Beijing (CN); Beijing BOE Display Technology Co., Ltd., Beijing (CN)

(72) Inventors: Lan Feng, Beijing (CN); Qingna Hou, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 100 days.

(21) Appl. No.: 15/993,895

(22) Filed: May 31, 2018

(65) Prior Publication Data

US 2019/0094978 A1  Mar. 28, 2019

(30) Foreign Application Priority Data

Sep. 22, 2017 (CN) .......................... 2017 1 0872518

(51) Int. Cl.
*G06F 3/041* (2006.01)
*G06F 3/01* (2006.01)
(Continued)

(52) U.S. Cl.
CPC .......... *G06F 3/017* (2013.01); *G02F 1/13306* (2013.01); *G02F 1/13338* (2013.01);
(Continued)

(58) Field of Classification Search
CPC ........... G02F 1/13306; G02F 1/133377; G02F 1/13338; G02F 2202/32;
(Continued)

(56) References Cited

U.S. PATENT DOCUMENTS

2016/0077347 A1  3/2016 Yoo et al.
2016/0260392 A1*  9/2016 Yamazaki ............ G09G 3/3413

FOREIGN PATENT DOCUMENTS

CN  102298457 A  12/2011
CN  102304263 A  1/2012

OTHER PUBLICATIONS

Second Office Action for Chinese Patent Application No. 201710872518.8 dated May 19, 2020.

* cited by examiner

*Primary Examiner* — Insa Sadio
(74) *Attorney, Agent, or Firm* — Calfee, Halter & Griswold LLP

(57) ABSTRACT

The disclosure provides a handwriting board and a control method thereof. The handwriting board includes: a touch structure configured to sense the handwriting touch position; a filter display structure comprising a photonic crystal layer and a filter driving circuit, the photonic crystal layer comprises a periodic defect structure of the surface and a photo-dielectric filled in the periodic defect structure, and the filter driving circuit is used for applying a voltage to the photonic crystal layer to drive a change in the state of the photo-dielectric in the periodic defect structure; and a controller configured to control the filter driving circuit to drive a change in the state of the photo-dielectric in the photonic crystal layer in the corresponding region according to the handwriting touch position so as to change the forbidden band of the photonic crystal layer in the corresponding region.

18 Claims, 16 Drawing Sheets

(51) Int. Cl.
  *G02F 1/133*      (2006.01)
  *G02F 1/1333*     (2006.01)
  *G06F 3/0488*     (2013.01)
  *G06F 3/044*      (2006.01)

(52) U.S. Cl.
  CPC ...... *G02F 1/133377* (2013.01); *G06F 3/0412* (2013.01); *G06F 3/0416* (2013.01); *G06F 3/0446* (2019.05); *G06F 3/0488* (2013.01); *G02F 2202/32* (2013.01); *G06F 3/044* (2013.01); *G06F 2203/04112* (2013.01)

(58) Field of Classification Search
  CPC ........... G06F 2203/04112; G06F 3/017; G06F 3/0412; G06F 3/0416; G06F 3/044; G06F 3/0446; G06F 3/0488
  See application file for complete search history.

generating a control signal, and controlling the filter driving circuit to — S201
determine the voltage value and to drive a change of the state of the
photo-dielectric in said photonic crystal layer so that the forbidden
bands of the photonic crystal layer is the first forbidden band.

Fig.10 acquiring a control signal of the selected or default writing color, or after the writing color switching key is triggered, acquiring a control signal of the selected writing color after the switching. — S301 acquiring the handwriting touch position, and controlling the filter driving circuit to adjust the voltage value and to change the state of the photo-dielectric of the photonic crystal layer in the region corresponding to the handwriting touch position so that the forbidden band of the photonic crystal layer in the region corresponding to the handwriting touch position is changed into a forbidden band displaying the selected or default writing color — S302

Fig.11 after the color switching key is triggered, controlling the filter driver circuit to adjust the voltage value and to drive a change of the state of the photo-dielectric in the photonic crystal layer so that the forbidden band of the photonic crystal layer in the region corresponding to the handwriting touch position is changed into the first forbidden band and the forbidden band of the photonic crystal layer in the region other than that corresponds to the handwriting touch position is changed into the second forbidden band ⎯⎯ S401

Fig.12 after the reset key is triggered, controlling the filter driving circuit to adjust the voltage value and to drive a change of the state of the photo-dielectric in the photonic crystal layer, so that the forbidden bands of the photonic crystal layer are all the first forbidden band. ⟶ S501

Fig.13 after the erasing key is triggered, controlling the filter driving circuit to adjust the voltage value and to drive a change of the state of the photo-dielectric of the photonic crystal layer in the sub-region corresponding to the handwriting touch position so that the forbidden bands of the photonic crystal layer in the sub-region is the first forbidden band ⟶ S601

Fig.14 after the erasing key is triggered, controlling the filter driving circuit to adjust the voltage value and to drive a change of the state of the photo-dielectric of the photonic crystal layer in the region corresponding to the handwriting touch position so that the forbidden band of the photonic crystal layer in the region corresponding to the handwriting touch position is the first forbidden band ~S601'

Fig.15

HANDWRITING BOARD AND CONTROL METHOD THEREOF

CROSS-REFERENCE TO RELATED APPLICATIONS

This application claims the benefit of Chinese Patent Application No. 201710872518.8, filed on Sep. 22, 2017 and entitled "Handwriting Board and Control Method Thereof", and the content of which is incorporated by reference herein in its entirety.

TECHNICAL FIELD

The disclosure relates to the field of touch display technology, and in particular, to a handwriting board and a control method thereof.

BACKGROUND

The current handwriting boards for handwriting display are mainly electronic ink handwriting boards based on electrophoretic display technology and cholesterol liquid crystal display technology, and rearrange the electrophoretic particles or cholesterol liquid crystal molecules with different colors at the touch position by recognizing the touch position and changing the electric field at the touch position, in order to present a different color display at the touch position from the other positions, resulting in the desired electronic ink display effect.

However, as the display technology continues to evolve, people are pursuing narrow bezel and thin-and-light properties of the display device, and also require the handwriting board as thin-and-light and portable as possible. In order to reduce the thickness of the handwriting board and to meet the flexure requirements of the flexible electronic papers, soft and transparent plastic materials are generally used as a protective layer to protect the electrophoretic particles or the cholesteric liquid crystal for achieving the electronic ink display. Due to the poor hardness of the plastic materials, it is difficult to effectively protect the electrophoretic particles or cholesteric liquid crystal. Once the surface of the handwriting board is impacted, the handwriting board may be partially damaged or even the entire display surface is scrapped.

SUMMARY OF THE INVENTION

The embodiments of the disclosure provide a handwriting board and a control method thereof.

In an aspect, the embodiments of the disclosure provide a handwriting board comprising a touch structure configured to sense the handwriting touch position; a filter display structure comprising a photonic crystal layer and a filter driving circuit, the photonic crystal layer comprises a periodic defect structure of the surface and a photo-dielectric filled in the defect structure, and the filter driving circuit is configured to apply voltage to the photonic crystal layer to drive a change of the state of the photo-dielectric in the defect structure; and a controller configured to control the filter driving circuit to drive a change of the state of the photo-dielectric in the photonic crystal layer in the corresponding region based on the handwriting touch position so as to change the forbidden bands of the photonic crystal layer in the corresponding region.

Further, the handwriting board according to the embodiments of the disclosure further comprises a backlight source which is disposed on the side facing away from the light-exiting surface of the filter display structure and configured to provide a backlight for the handwriting board.

Further, the touch structure is disposed on the light-exiting surface of the filter display structure.

Further, the touch structure comprises a touch electrode and a sensing electrode, which are intersecting with and are insulated from each other.

Further, the filter driving circuit comprises a first electrode and a second electrode, which are insulated from each other and are separately parallel to the photonic crystal layer, to form an electric field for driving the photonic crystal layer after applying a voltage each of them, respectively.

Further, the first electrode comprises a plurality of first sub-electrodes which are arranged in a matrix.

Further, the controller is further configured to control a change of the state of the photo-dielectric in the photonic crystal layer to bring the photonic crystal layer to be in a same forbidden band.

Further, the handwriting board according to the embodiments of the disclosure comprises a plurality of handwriting regions thereon, and the controller controls the change of the state of the photo-dielectric in the photonic crystal layer corresponding to the handwriting touch position in each of the handwriting regions or of the state of the photo-dielectric in the photonic crystal layer in each of the handwriting regions.

Further, the handwriting board according to the embodiments of the disclosure is disposed with a writing color switching key thereon, or the handwriting board according to the embodiments of the disclosure is configured to display a writing color switching key; after the writing color switching key is triggered, the controller is configured to control the filter driving circuit to change the state of the photo-dielectric in the photonic crystal layer in the region corresponding to the handwriting touch position so that the forbidden band of the photonic crystal layer in the region corresponding to the handwriting touch position is changed into a forbidden band displaying the selected or default writing color.

Further, the handwriting board according to the embodiments of the disclosure is further disposed with a color switching key thereon, or the handwriting board according to the embodiments of the disclosure is configured to display a color switching key, the forbidden band of the photonic crystal layer in the region corresponding to the handwriting touch position is a second forbidden band, and the forbidden band of the photonic crystal layer in the region other than that corresponds to the handwriting touch position is a first forbidden band; after the color switching key is triggered, the controller is further configured to control the filter driving circuit to drive a change of the state of the photo-dielectric in the photonic crystal layer so that the forbidden band of the photonic crystal layer in the region corresponding to the handwriting touch position is changed into the first forbidden band and the forbidden band of the photonic crystal layer in the region other than that corresponds to the handwriting touch position is changed into the second forbidden band.

Further, the handwriting board according to the embodiments of the disclosure is further disposed with a reset key thereon, or the handwriting board according to the embodiments of the disclosure is configured to display a reset key, the forbidden band of the photonic crystal layer in the region corresponding to the handwriting touch position is a second forbidden band, and the forbidden band of the photonic crystal layer in the region other than that corresponds to the handwriting touch position is a first forbidden band; after the reset key is triggered, the controller is further configured to control the filter driving circuit to drive a change of the state of the photo-dielectric in the photonic crystal layer so that the forbidden bands of the photonic crystal layer are all the first forbidden band.

Further, the handwriting board according to the embodiments of the disclosure is further disposed with an erasing key thereon, or the handwriting board according to the embodiments of the disclosure is configured to display an erasing key, the forbidden band of the photonic crystal layer in the region corresponding to the handwriting touch position is a second forbidden band, and the forbidden band of the photonic crystal layer in the region other than that corresponds to the handwriting touch position is a first forbidden band. The handwriting board is divided into a plurality of sub-regions thereon, after the erasing key is triggered, the controller is further configured to control the filter driving circuit to drive a change of the state of the photo-dielectric of the photonic crystal layer in the sub-region corresponding to the handwriting touch position so that the forbidden bands of the photonic crystal layer in the sub-region is the first forbidden band; alternatively or, after the erasing key is triggered, the controller is further configured to control the filter driving circuit to drive a change of the state of the photo-dielectric of the photonic crystal layer in the region corresponding to the handwriting touch position so that the forbidden band of the photonic crystal layer in the region corresponding to the handwriting touch position is the first forbidden band.

In another aspect, the embodiments of the disclosure provide a control method of the handwriting board according to any of the above technical solutions, which comprises acquiring the handwriting touch position; and generating a control signal corresponding to the handwriting touch position, based on the control signal controlling the filter driving circuit to adjust the voltage value and to change the state of the photo-dielectric of the photonic crystal layer in the region corresponding to the handwriting touch position so as to change the forbidden bands of the photonic crystal layer in the region corresponding to the handwriting touch position.

Further, before acquiring the handwriting touch position and a control signal corresponding to the handwriting touch position, the control method further comprises: generating a control signal, and controlling the filter driving circuit to determine the voltage value and to drive a change of the state of the photo-dielectric in the photonic crystal layer so that the forbidden bands of the photonic crystal layer are the first forbidden band.

Further, the handwriting board is disposed with a writing color switching key thereon, or the handwriting board is configured to display a writing color switching key, the control method further comprises: acquiring a control signal of the selected or default writing color, or after the writing color switching key is triggered, acquiring a control signal of the selected writing color after the switching; and acquiring the handwriting touch position, and controlling the filter driving circuit to adjust the voltage value and to change the state of the photo-dielectric of the photonic crystal layer in the region corresponding to the handwriting touch position so that the forbidden band of the photonic crystal layer in the region corresponding to the handwriting touch position is changed into a forbidden band displaying the selected or default writing color.

Further, the handwriting board is further disposed with a color switching key thereon, or the handwriting board is configured to display a color switching key, the forbidden band of the photonic crystal layer in the region corresponding to the handwriting touch position is a second forbidden band, and the forbidden band of the photonic crystal layer in the region other than that corresponds to the handwriting touch position is a first forbidden band, the control method further comprises: after the color switching key is triggered, controlling the filter driving circuit to adjust the voltage value and to drive a change of the state of the photo-dielectric in the photonic crystal layer so that the forbidden band of the photonic crystal layer in the region corresponding to the handwriting touch position is changed into the first forbidden band and the forbidden band of the photonic crystal layer in the region other than that corresponds to the handwriting touch position is changed into the second forbidden band.

Further, the handwriting board is further disposed with a reset key thereon, or the handwriting board is configured to display a reset key, the forbidden band of the photonic crystal layer in the region corresponding to the handwriting touch position is a second forbidden band, and the forbidden band of the photonic crystal layer in the region other than that corresponds to the handwriting touch position is a first forbidden band, the control method further comprises: after the reset key is triggered, controlling the filter driving circuit to adjust the voltage value and to drive a change of the state of the photo-dielectric in the photonic crystal layer, so that the forbidden bands of the photonic crystal layer are all the first forbidden band.

Further, the handwriting board is further disposed with an erasing key, or the controller is configured to display an erasing key, the forbidden band of the photonic crystal layer in the region corresponding to the handwriting touch position is a second forbidden band, and the forbidden band of the photonic crystal layer in the region other than that corresponds to the handwriting touch position is a first forbidden band; the handwriting board is divided into a plurality of sub-regions thereon, the control method further comprises: after the erasing key is triggered, controlling the filter driving circuit to adjust the voltage value and to drive a change of the state of the photo-dielectric of the photonic crystal layer in the sub-region corresponding to the handwriting touch position so that the forbidden bands of the photonic crystal layer in the sub-region is the first forbidden band; alternatively or, the control method further comprises: after the erasing key is triggered, controlling the filter driving circuit to adjust the voltage value and to drive a change of the state of the photo-dielectric of the photonic crystal layer in the region corresponding to the handwriting touch position so that the forbidden band of the photonic crystal layer in the region corresponding to the handwriting touch position is the first forbidden band.

BRIEF DESCRIPTION OF THE DRAWINGS

The accompanying drawings used in the description of the embodiments of the disclosure or in the prior art is briefly introduced below, in order to illustrate the technical solutions in the embodiments of the disclosure or in the prior art more clearly. Apparently, the accompanying drawings in the following description are merely directed to some embodiments of the disclosure. For those skilled in the art, other drawings may be obtained based on these drawings without any creative work.

FIG. 10 is a second flow chart of a control method of a handwriting board provided by an embodiment of the disclosure;

FIG. 11 is a third flow chart of a control method of a handwriting board provided by an embodiment of the disclosure;

FIG. 12 is a fourth flow chart of a control method of a handwriting board provided by an embodiment of the disclosure;

FIG. 13 is a fifth flow chart of a control method of a handwriting board provided by an embodiment of the disclosure;

FIG. 14 is a sixth flow chart of a control method of a handwriting board provided by an embodiment of the disclosure;

FIG. 15 is a seventh flow chart of a control method of a handwriting board provided by an embodiment of the disclosure.

LEGENDS TO THE FIGURE

10—backlight source; 20—filter display structure; 21—photonic crystal layer; 210—defect structure; 22—filter driving circuit; 221—first electrode; 2210—first sub-electrode; 222—second electrode; 23—photo-dielectric; 30—touch structure; 31—touch electrode; 32—sensing electrode; 40—controller; 60—color switching key; 70—reset key; 80—erasing key; 90—writing color switching key; Y—handwriting region.

DETAILED DESCRIPTION

The technical solutions in the embodiments of the disclosure are clearly and completely described below with reference to the accompanying drawings in the embodiments of the present disclosure. Apparently, the described embodiments are merely a part but not all of the embodiments of the disclosure. Based on the embodiments of the disclosure, all the other embodiments, which can be obtained by those skilled in the art without inventive work, are within the scope of the disclosure.

Figure 1:
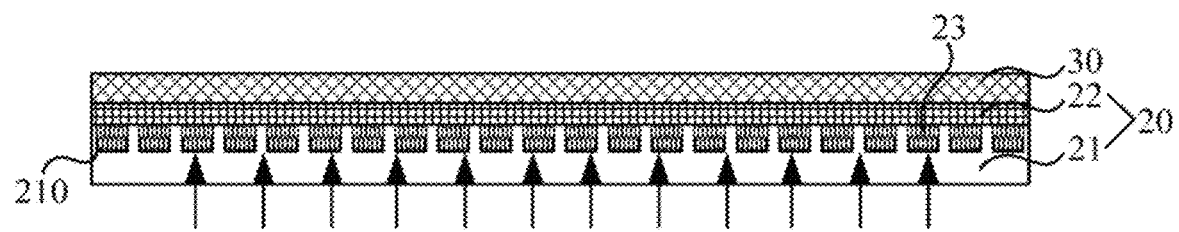
FIG. 1 is a first structural schematic of a handwriting board provided by an embodiment of the disclosure.

An embodiment of the disclosure provides a handwriting board, as shown in FIG. 1, comprising: a touch structure 30 configured to sense the handwriting touch position; a filter display structure 20 comprising a photonic crystal layer 21 and a filter driving circuit 22, the photonic crystal layer 21 comprises a periodic defect structure 210 of the surface and a photo-dielectric 23 filled in the defect structure 210; and the filter driving circuit 22 is configured to apply voltage to the photonic crystal layer 21 to drive a change of the state of the photo-dielectric 23 in the defect structure 210; and a controller 40 configured to control the filter driving circuit 22 to drive a change of the state of the photo-dielectric 23 in the photonic crystal layer 21 in the corresponding region based on the handwriting touch position so as to change the forbidden bands of the photonic crystal layer 21 in the corresponding region. The direction indicated by the solid arrow in FIG. 1 is the light incident direction of the backlight of the handwriting board according to the embodiment of the disclosure.

It should be noted that first, a photonic crystal is of an artificial periodic dielectric structure with a photonic band-gap (PBG) characteristic. Photonic band-gap can modulate electromagnetic waves at the corresponding wavelengths. When the electromagnetic waves propagate in a photonic band-gap material, it is modulated by Bragg scattering and the electromagnetic wave energy forms an energy band structure. The band-gap that appears between a band and another band is the photonic band-gap. Photons with a band-gap in the photonic band-gap are blocked to pass by the photonic crystal, allowing the photonic crystal to have a wavelength selective function that selectively passes the light in a particular wavelength band and blocks the passage of the light in other wavelength ranges. Photonic crystals include one-dimensional, two-dimensional and three-dimensional photonic crystals. One-dimensional photonic crystals have a simple structure, are convenient to be fabricated, and can be fabricated by means of vacuum coating technology, sol-gel technology, molecular beam epitaxy, etc. The photonic crystal layer according to the embodiments of the disclosure is a one-dimensional photonic crystal structure as fabricated by the above means. According to the characteristic of the photonic crystal enabling to selectively penetrate light by wavelength, a periodic defect structure is disposed on the photonic crystal. The periodic defect structure disposed on the one-dimensional photonic crystal layer is generally a strip-shaped groove fabricated on the photonic crystal layer. By changing the defect structure, the forbidden bandwidth of the photonic crystal can be changed, thereby adjusting the passing state of the visible light band.

Secondly, since the defect structure is a strip-shaped groove directly fabricated on the photonic crystal layer, the width of the strip-shaped groove and the distance between two adjacent strip-shaped grooves cannot be changed after the fabrication is completed. Therefore, the defect structure is filled with the photo-dielectric 23, and a voltage is applied to the photonic crystal layer 21 by the filter driving circuit 22 to drive a change of the physical state of the photo-dielectric 23 so as to change the forbidden band of the photonic crystal layer 21 in the corresponding region. As an example, the photo-dielectric 23 may be a liquid crystal, and the changes of the physical state of the photo-dielectric 23 include the deflection of the liquid crystal, the torsion degree of the liquid crystal's morphology, and the like. By changing the physical state of the liquid crystal, the defect structure 210 present in the liquid crystal is changed, thereby achieving the effect of changing the forbidden band width of the photonic crystal.

Figure 2:
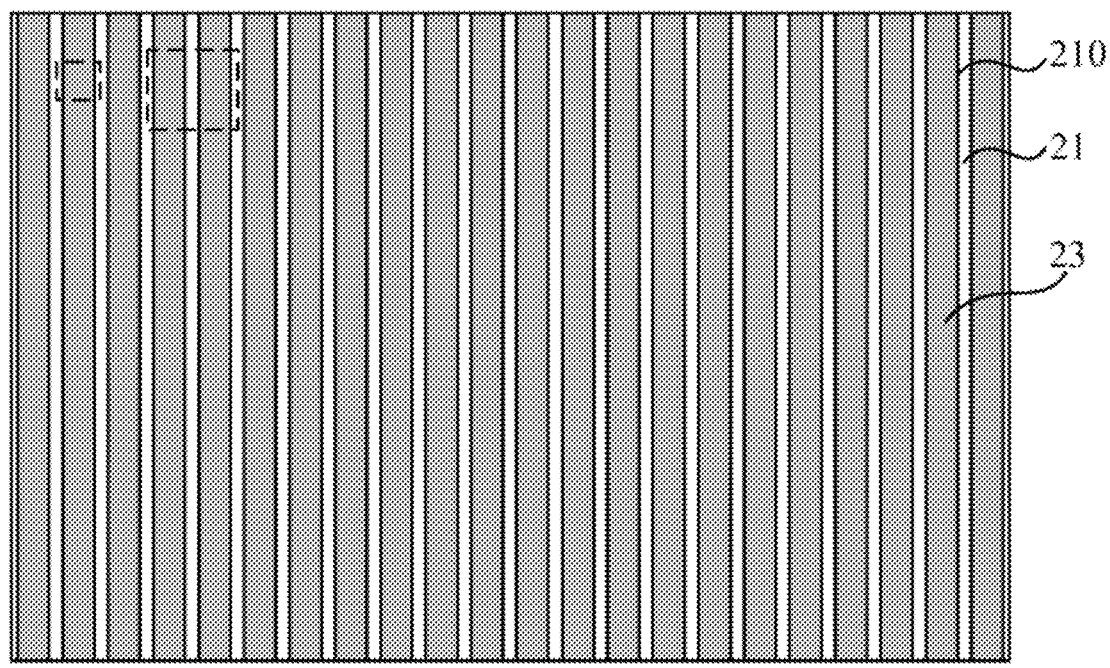
FIG. 2 is a top view of the photonic crystal layer as shown in FIG. 1.

Thirdly, in the handwriting board according to the embodiments of the disclosure, the handwriting board may be divided into a plurality of pixels. Different from the pixel structures in a display panel, the plurality of pixels divided here refers to a minimum display structure divided artificially on the handwriting board. Therefore, the size of the pixel can be artificially divided depending on the resolution display capability of the handwriting board, and each pixel can only display one color state at the exact same time. Since only one forbidden band can be formed across the width of the stripe-shaped groove of one defect structure 210, the width of each pixel should be at least greater than the width of the stripe-shaped groove of one defect structure 210. For example, as shown in the dashed box in FIG. 2, the width of one pixel is equal to the width of the stripe-shaped groove of the defect structure 210, or equal to the width of the stripe-shaped groove of the plurality of defect structures 210.

Fourthly, the filter driving circuit 22 is configured to drive a change of the physical state of the photo-dielectric 23 in the defect structure 210 by a voltage difference applied by an electric field. The filter driving circuit 22 generally includes electrodes for forming an electric field. The setting modes and the setting relationships of the electrodes are not particularly limited in the embodiments of the disclosure. As an example, the electric field for driving a liquid crystal display of a Twist Nematic (TN) liquid crystal display device is a vertical electric field formed between a common electrode and a pixel electrode which are respectively disposed on a color film substrate and an array substrate arranged opposite to each other. The electrodes of the filter driving circuit 22 according to the embodiments of the disclosure may use the vertical electric field mode of a TN-type liquid crystal display device to drive a change of the physical state of the photo-dielectric 23 in the defect structure 210 at the corresponding position. As another example, the electric field for driving a liquid crystal display in an Advanced-Super Dimensional Switching (ADS) liquid crystal display device is a multi-dimensional electric field formed by a parallel electric field generated at the edge of a pixel electrode in the same plane and a vertical electric field generated between a pixel electrode layer and a common electrode layer. The electrodes of the filter driving circuit 22 in the embodiments of the disclosure may also use the multi-dimensional electric field mode of an ADS-type liquid crystal display device to drive a change of the physical state of the photo-dielectric 23 in the defect structure 210 at the corresponding position. As still another example, the electric field for driving a liquid crystal display of an In Plane Switch (IPS) liquid crystal display device is a horizontal electric field formed between a common electrode and a pixel electrode which are disposed at intervals and in parallel with each other on an array substrate. The electrodes of the filter driving circuit 22 according to the embodiments of the disclosure may use the horizontal electric field mode of an IPS-type liquid crystal display device to drive a change of the physical state of the photo-dielectric 23 in the defect structure 210 at the corresponding position.

Fifthly, the touch operation of the handwriting board according to the embodiments of the disclosure may be performed either by a finger directly or by using a handwriting pen or other tools.

The embodiments of the disclosure provide a handwriting board and a control method thereof, which comprises a touch structure configured to sense the handwriting touch position; a filter display structure comprising a photonic crystal layer and a filter driving circuit, the photonic crystal layer comprises a periodic defect structure of the surface and a photo-dielectric filled in the defect structure, and the filter driving circuit is configured to apply voltage to the photonic crystal layer to drive a change of the state of the photo-dielectric in the defect structure; and a controller configured to control the filter driving circuit to drive a change of the state of the photo-dielectric in the photonic crystal layer in the corresponding region based on the handwriting touch position so as to change the forbidden bands of the photonic crystal layer in the corresponding region. The filter display structure comprises a photonic crystal layer and a filter driving circuit, the photonic crystal layer has a periodic defect structure at the surface, and the defect structure is filled with a photo-dielectric. The controller controls the filter driving circuit to drive a change of the state of the photo-dielectric in the photonic crystal layer in the corresponding region, which allows a change of the forbidden bands of the photonic crystal layer in the corresponding region. In this way, the touch and the handwriting display of the handwriting board can be achieved by using the difference between the wavelength range of the light exiting through the photonic crystal layer at the handwriting touch position and the wavelength range of the light exiting through the photonic crystal layer at the other positions. The handwriting display achieved by changing the width state of the forbidden band of the photonic crystal layer, can improve the anti-impact ability of the handwriting board and the service life of the handwriting board without increasing the thickness of the handwriting board itself. Meanwhile, since no additional filter layer and polarizing layer structures are required to be disposed on the handwriting board, the manufacturing cost of the handwriting is reduced.

Figure 3A:
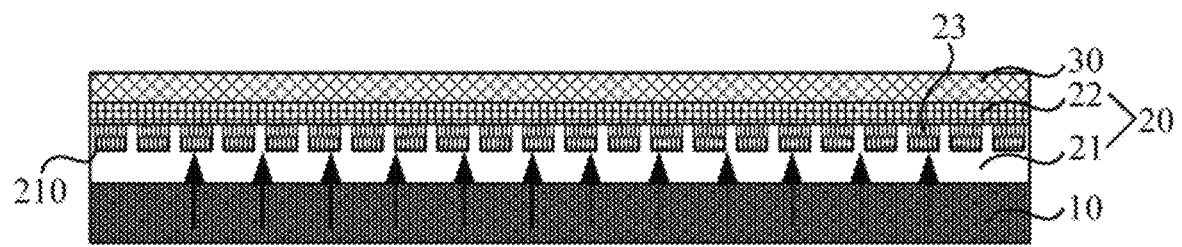
FIG. 3(a) is a second structural schematic of a handwriting board provided by an embodiment of the disclosure.

As an example, as shown in FIG. 3(a), the handwriting board according to the embodiments of the disclosure further comprises a backlight source 10 which is disposed on the side facing away from the light-exiting surface of the filter display structure 20 and configured to provide a backlight for the handwriting board.

The handwriting board may be non-operable due to an unstable natural light intensity or a low natural light intensity within a room with a poor lighting or at night. Therefore, as shown in FIG. 3(a), by disposing the backlight source 10 on the side facing away from the light-exiting surface of the filter display structure 20, it is possible to ensure the intensity of the backlight display of the handwriting board according to the embodiments of the disclosure, thereby further improving the display resolution of the handwriting board according to the embodiments of the disclosure.

As an example, as shown in FIG. 3(a), the touch structure 30 is disposed on the light-exiting surface of the filter display structure 20.

As shown in FIG. 3(a), by disposing the touch structure 30 on the light-exiting surface of the filter display structure 20, it is possible to perform a touch operation directly on the touch structure 30 and enable the touch structure 30 to capture the touch position of the finger or the handwriting pen.

Figure 3B:
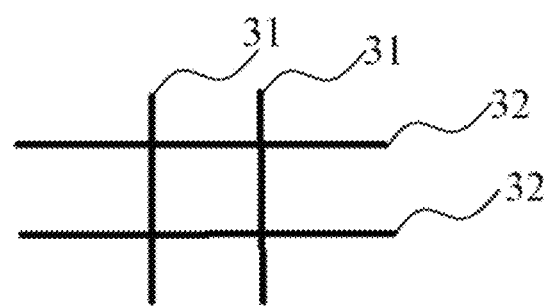
FIG. 3(b) is a structural schematic of a touch structure provided by an embodiment of the disclosure.

Further, as shown in FIG. 3(b), the touch structure 30 comprises a touch electrode (TX) 31 and a sensing electrode (RX) 32 which are intersected and insulated from each other.

As an example, the touch structure 30 according to the embodiments of the disclosure adopts a mutual capacitance type touch and comprises a touch electrode 31 and a sensing electrode 32 which are intersected and insulated from each other. The touch electrode 31 and the sensing electrode 32 which are insulated from each other are spatially intersecting and overlapping with each other in a row-and-column intersection. Mutual capacitance will be generated at each spatial intersecting and overlapping position of the touch electrode 31 and the sensing electrode 32. When a user performs a touch operation and at the position that the finger touches, a coupling capacitance will be formed between the finger and the touch electrode 31 due to the electric field in human, which may affect the capacitance value of the mutual capacitance between the touch electrode 31 and the sensing electrode 32, thereby obtaining information about the coordinate of the position where the finger performs the touch operation on the touch structure 30.

The touch electrode 31 and sensing electrodes 32 which are intersected with and insulated from each other may be disposed either in different layers or in the same layer. Two adjacent touch electrodes 31 separated by a sensing electrode 32 are electrically connected via a bridge, or two adjacent sensing electrodes 32 separated by a touch electrode 31 are electrically connected. The disposing mode of the touch structure 30 is not particularly limited in the embodiments of the disclosure.

Figure 4:
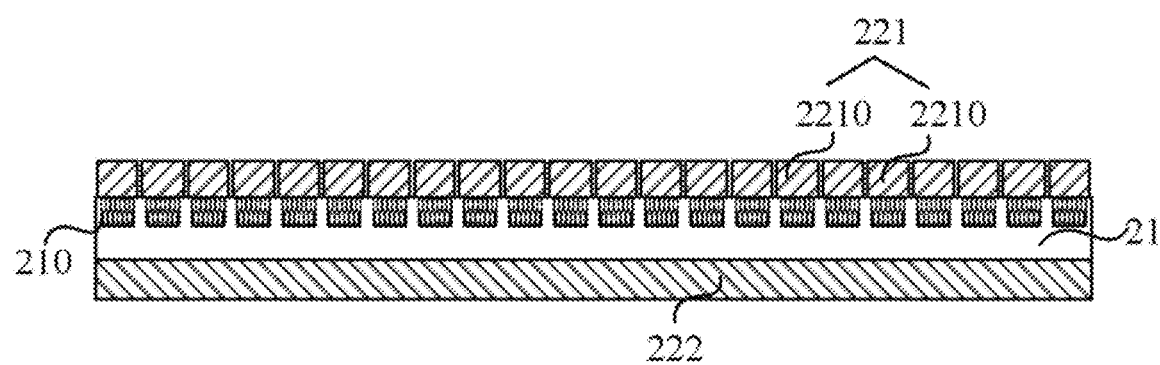
FIG. 4 is a third structural schematic of a handwriting board provided by an embodiment of the disclosure.

Further, as shown in FIG. 4, the filter driving circuit 22 comprises a first electrode 221 and a second electrode 222, which are insulated from each other and are separately parallel to the photonic crystal layer 21, to form an electric field for driving the photonic crystal layer 21 after separately applying a voltage thereto.

For example, as shown in FIG. 4, the embodiment of the disclosure adopts a vertical filed mode. By disposing the first electrode 221 on the photonic crystal layer 21 and the second electrode 222 under the photonic crystal layer 21, the first electrode 221 and the second electrode 222 are insulated from each other and both are parallel to the photonic crystal layer 21. A voltage difference is formed between the first electrode 221 and the second electrode 222 by applying a voltage to the first electrode 221 and the second electrode 222, respectively. The voltage differences are different at various positions on the photonic crystal layer 21, which enables to drive a change of the physical state of the photo-dielectric 23 in the defect structure 210 corresponding to different positions of the photonic crystal layer 21.

Figure 5:
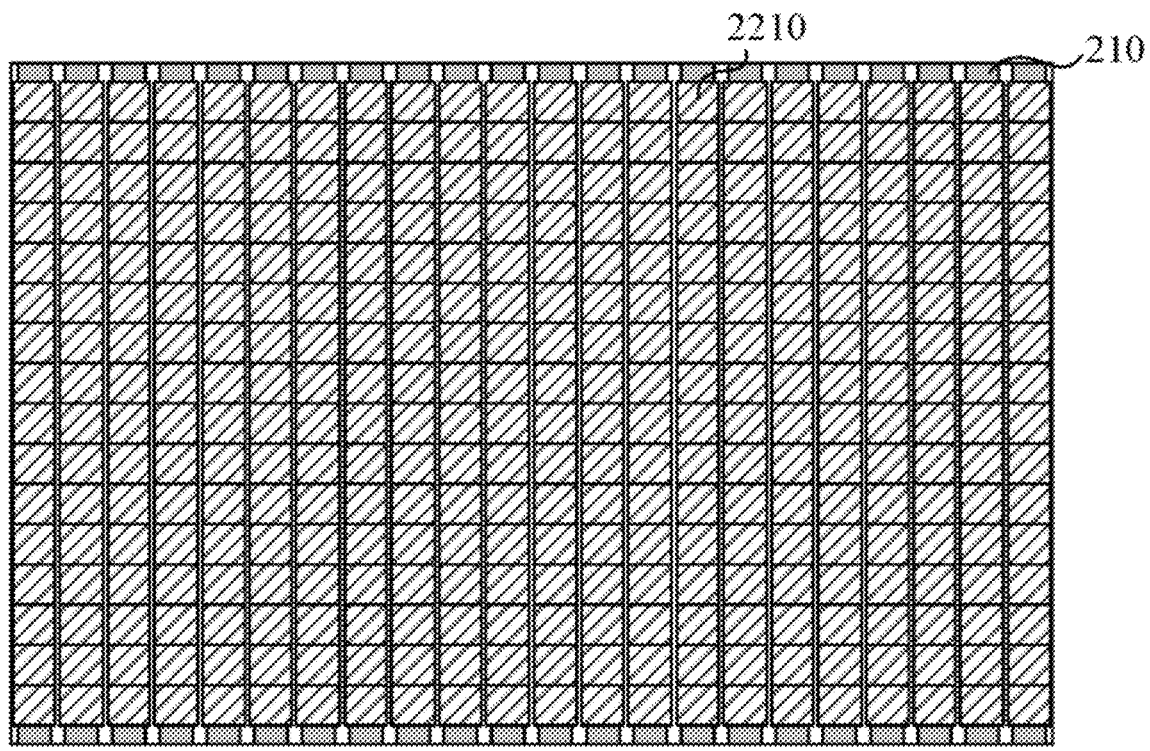
FIG. 5 is a top view of FIG. 4.

As an example, as shown in FIG. 5, the first electrode 221 comprises a plurality of first sub-electrodes 2210 which are arranged in a matrix.

As shown in FIG. 5, the plurality of first sub-electrodes 2210 are arranged in a matrix. By applying a different voltage to each of the first self-electrodes 2210, respectively, and applying a same voltage to the second electrode 222, it is possible to form a different voltage difference at each of the positions on the handwriting board, thereby providing a separate control for each of the positions on the handwriting board to improve the display resolution of the handwriting board.

Further, the controller 40 is further configured to control a change of the state of the photo-dielectric 23 in the photonic crystal layer 21 to bring the photonic crystal layer 21 in a same forbidden band.

The controller 40 controls the first electrode 221 of the filter driving circuit 22 to be applied a same voltage and controls the second electrode 222 also to be applied a same voltage. Even if the voltage differences are the same at various positions on the handwriting board and the states of the photo-dielectric 23 in the photonic crystal layer 21 are the same, it is possible to bring the photonic crystal layer 21 to be in a same forbidden band. In this case, the handwriting board displays a same ground color with a same color.

Figure 7:
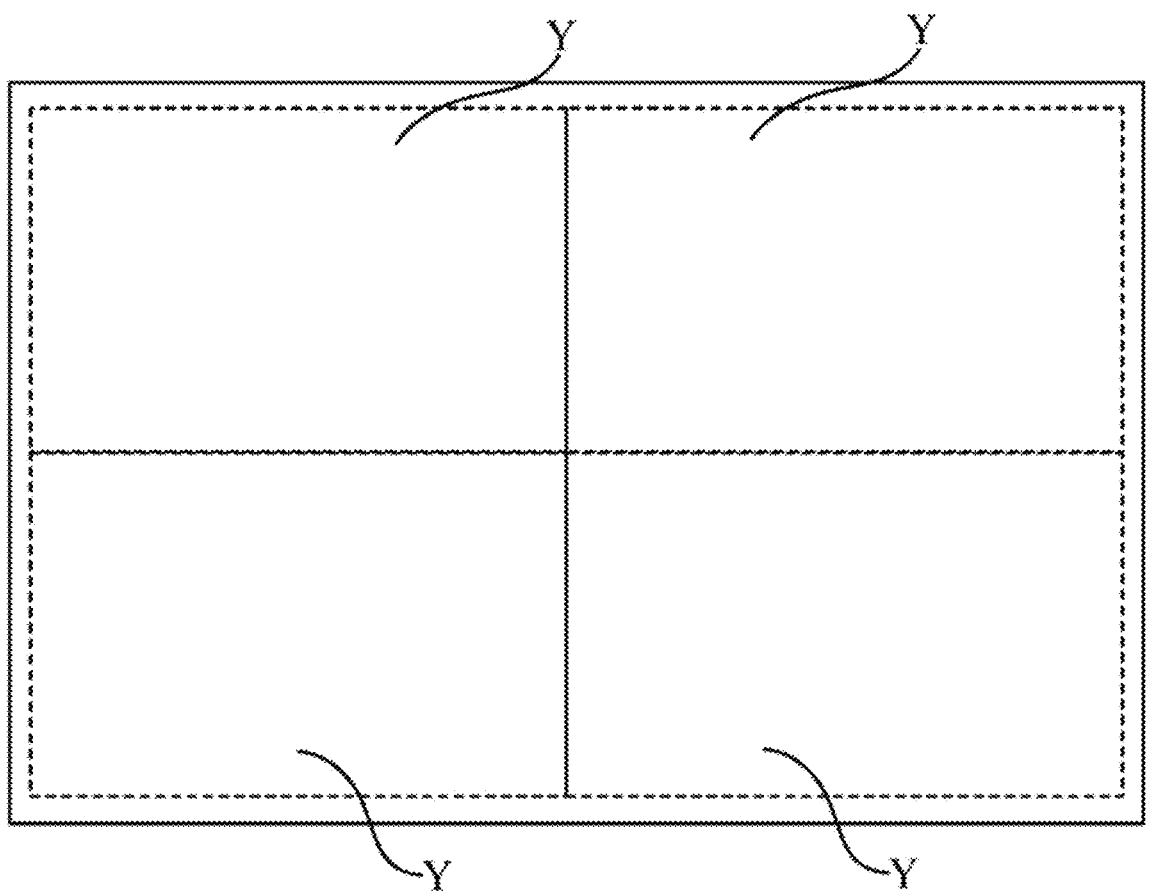
FIG. 7 is a structural schematic of a handwriting board comprising a plurality of handwriting regions provided by an embodiment of the disclosure.

Further, as shown in FIG. 7, the handwriting board according to an embodiment of the disclosure comprises a plurality of handwriting regions Y thereon, and the controller 40 provides a separate control to change the state of the photo-dielectric 23 in the photonic crystal layer 21 corresponding to the handwriting touch position in each of the handwriting regions Y or to change the state of the photo-dielectric 23 in the photonic crystal layer 21 in each of the handwriting regions Y.

Figure 6:
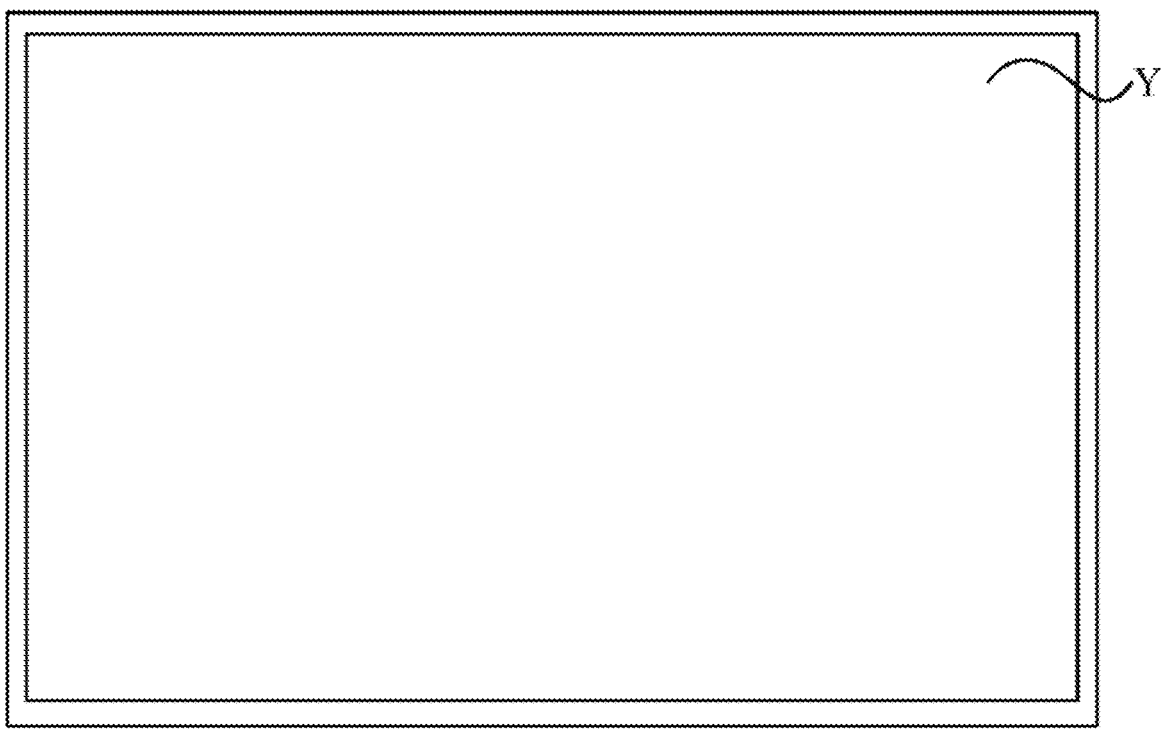
FIG. 6 is a structural schematic of a handwriting board comprising only one handwriting region provided by an embodiment of the disclosure.

The handwriting regions Y of the handwriting board according to the embodiments of the disclosure, refer to regions on the handwriting board, that are capable of sensing the touch position by a finger and of displaying the change in touch operation under the control provided by the controller 40. At least one handwriting region Y is disposed on the handwriting board. For example, as shown in FIG. 6, the handwriting regions Y includes only one, similar to the display region of a display panel, which refers to the entire region which allows for handwriting, except for the bordering regions. The controller 40 controls the filter driving circuit 22 to drive a change of the state of the photo-dielectric 23 in the photonic crystal layer 21 in the handwriting region Y so that the entire handwriting region Y can present a same color display. Depending on the specific settings of the forbidden band width and the forbidden band position, for example, the change of the state of the photo-dielectric 23 in the photonic crystal layer 21 within the handwriting region Y brings the forbidden band to be in the visible wavelength band, and the forbidden band width is exactly equal to the entire visible light wavelength range, at this point, the entire handwriting region presents an opaque black display, that is, the forbidden band is one displaying a black color. The controller 40 controls the filter driving circuit 22 to drive a change of the state of the photo-dielectric 23 in the photonic crystal layer 21 in the handwriting region Y so that the forbidden band of the photonic crystal layer 21 at the touch position is changed into another forbidden band, which is, for example, positioned outside of the visible light wavelength band, and the width of the forbidden band does not cover the wavelength range of the visible light, that is, it is transparent to the entire visible light band at the touch position, then it presents a white display with full visible light transmission at the touch position. That is, the forbidden band is one displaying a white color.

As another example, the handwriting board also comprises a plurality of handwriting regions Y thereon. For example, as shown in FIG. 7, the handwriting board is disposed with four handwriting regions Y. Each of the four handwriting regions Y is individually capable of being controlled by the controller 40 to provide a separate display. Alternatively, a touch or handwriting operation may be performed in the four handwriting regions Y, respectively, under their respective control of the controller 40. Moreover, the ground display colors of the four handwriting regions Y may be set to be different from each other and the touch or handwriting display colors within the four handwriting regions Y may also be set to be different from each other. The following description is provided by taking that the handwriting board is disposed with only one handwriting region Y as an example.

Figure 8:
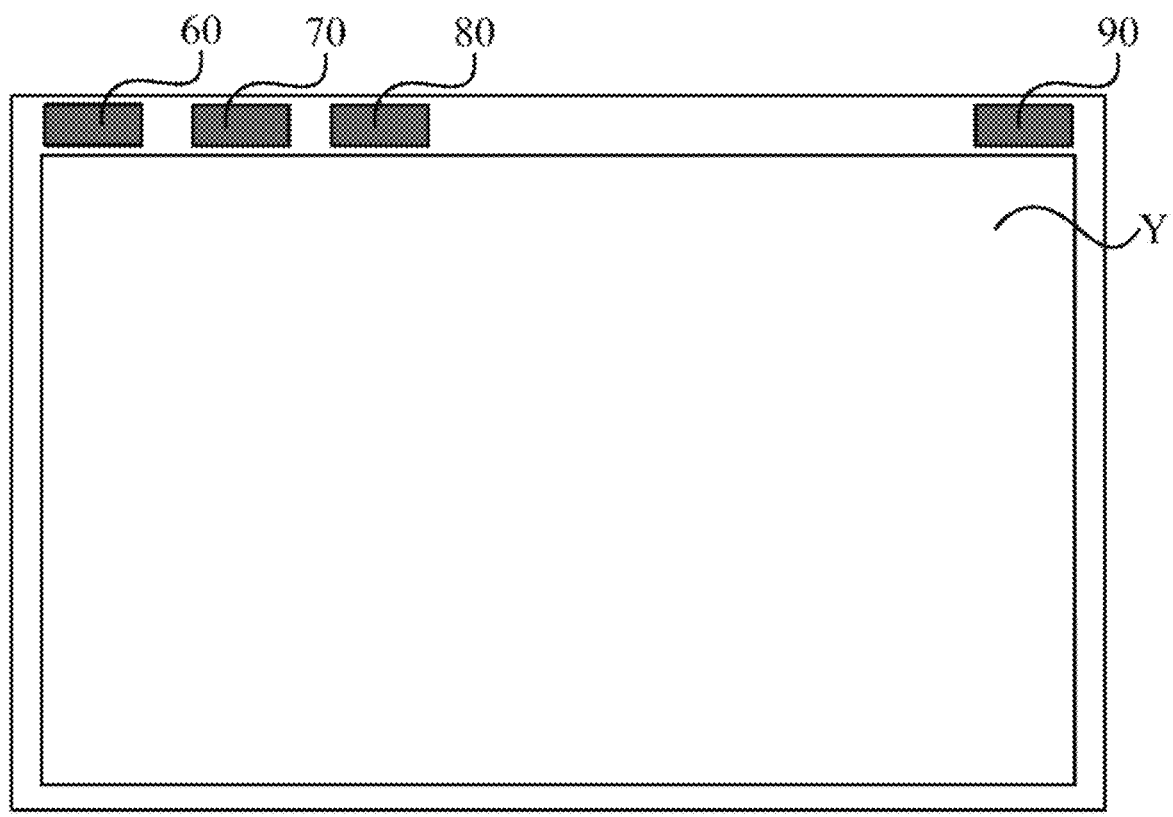
FIG. 8 is a structural schematic of a handwriting board comprising a physical color switching key provided by an embodiment of the disclosure.

For example, as shown in FIG. 8, the handwriting board according to the embodiments of the disclosure is disposed with a writing color switching key 90 thereon, or the handwriting board according to the embodiments of the disclosure is configured to display a writing color switching key 90. After the writing color switching key 90 is triggered, the controller 40 controls the filter driving circuit 22 to change the state of the photo-dielectric 23 in the photonic crystal layer 21 in the region corresponding to the handwriting touch position so that the forbidden band of the photonic crystal layer 21 in the region corresponding to the handwriting touch position is changed into a forbidden band displaying the selected or default writing color.

In this way, the handwriting board may have at least two selectable writing colors, wherein each of the writing colors corresponds to a forbidden band. There are two ways to choose the writing colors of the handwriting board. The first way is to predefine one writing color as the default writing color. For example, in the case of being in the power-on state and without a selection of the writing color, the handwriting board defaults to use a certain fixed writing color for writing display, that is, the controller 40 directly controls the filter driving circuit 22 to change the physical state of the photo-dielectric 23 of the photonic crystal layer 21 at the touch position in the handwriting region, so that the forbidden band of the photonic crystal layer 21 at the corresponding touch position is a forbidden band for displaying the corresponding default writing color. The user can select another writing color and change the default writing color when he wishes to do so. The second way is in the case that after turning the device on to be used, there is a need to make a selection for a plurality of writing colors. After one of the writing colors is selected, the controller 40 controls the filter driving circuit 22 to change the physical state of the photo-dielectric 23 of the photonic crystal layer 21 at the touch position in the handwriting regions according to the forbidden band corresponding to the selected writing colors, so that the forbidden band of the photonic crystal layer 21 at the corresponding touch position is a forbidden band displaying the selected writing color.

It should be noted that, the writing color switching key 90 on the handwriting board includes two disposing modes. One mode is, as shown in FIG. 8, to dispose a physical key in the form of a key, dial, or others at a position outside the handwriting region Y of the handwriting board, which is triggered by user's press or dialing. The other mode is to display a virtual writing color switching key 90 in the handwriting region Y of the handwriting board, which is triggered by touching the virtual writing color switching key 90 by user's finger. The color switching key 60, the reset key 70, the erasing key 80, etc. as described below also include the above two disposing modes.

Further, as shown in FIG. 8, the handwriting board according to the embodiments of the disclosure is further disposed with a color switching key 60 thereon, or the handwriting board according to the embodiments of the disclosure is configured to display a color switching key 60. The forbidden band of the photonic crystal layer 21 in the region corresponding to the handwriting touch position is a second forbidden band, and the forbidden band of the photonic crystal layer 21 in the region other than that corresponds to the handwriting touch position is a first forbidden band. After the color switching key 60 is triggered, the controller 40 further controls the filter driving circuit 22 to drive a change of the state of the photo-dielectric 23 in the photonic crystal layer 21 so that the forbidden band of the photonic crystal layer 21 in the region corresponding to the handwriting touch position is changed into the first forbidden band and the forbidden band of the photonic crystal layer 21 in the region other than that corresponds to the handwriting touch position is changed into the second forbidden band.

Before the color switching key 60 is triggered, the forbidden band of the photonic crystal layer 21 in the region corresponding to the handwriting touch position on the handwriting board is a second forbidden band, and the forbidden band of the photonic crystal layer 21 in the region other than that corresponds to the handwriting touch position is the first forbidden band. For example, when the first forbidden band is a white display which is transparent to the whole visible light wavelength band and the second forbidden band is a black display which is opaque to the whole visible light wavelength band, the handwriting region Y on the handwriting board shows a display state of black fonts with a white ground color before the color switching key 60 is triggered.

On this basis, after the color switching key 60 is triggered, the controller 40 controls the filter driving circuit 22 to drive a change of the state of the photo-dielectric 23 of the photonic crystal layer 21 so that the forbidden band of the photonic crystal layer 21 in the region corresponding to the handwriting touch position is changed into the first forbidden band and the forbidden band of the photonic crystal layer 21 in the region other than that corresponds to the handwriting touch position is changed into the second forbidden band. The above operations achieve an interchange between the ground color and the writing colors of handwriting board, the display state in the handwriting region Y on the handwriting board changes into white fonts with a black ground color. When the color switching key 60 is triggered again, it is also possible to interchange the ground color with the writing colors of the handwriting board again in the same switching manner.

Further, as shown in FIG. 8, the handwriting board according to the embodiments of the disclosure is further disposed with a reset key 70 thereon, or the handwriting board according to the embodiments of the disclosure is configured to display a reset key 70. The forbidden band of the photonic crystal layer 21 in the region corresponding to the handwriting touch position is a second forbidden band, and the forbidden band of the photonic crystal layer 21 in the region other than that corresponds to the handwriting touch position is a first forbidden band. After the reset key 70 is triggered, the controller 40 is further used to control the filter driving circuit 22 to drive a change of the state of the photo-dielectric 23 in the photonic crystal layer 21 so that the forbidden bands of the photonic crystal layer 21 are all the first forbidden band.

Before the reset key 70 is triggered, the forbidden band of the photonic crystal layer 21 in the region corresponding to the handwriting touch position in the handwriting region Y is a second forbidden band, and the forbidden band of the photonic crystal layer 21 in the region other than that corresponds to the handwriting touch position is the first forbidden band, that is, the display ground color in the handwriting region Y appears the color displayed by the second forbidden band, and when performing a touch writing in the handwriting region Y, the writing track appears the color displayed by the first forbidden band. When the reset key 70 is triggered after the writing is completed, the controller 40 controls the filter driving circuit 22 to drive a change of the state of the photo-dielectric 23 in the photonic crystal layer 21 so that the forbidden bands of the photonic crystal layer 21 are all the first forbidden band. In this way, for example, the color displayed by the first forbidden band is red, and the color displayed by the second forbidden band is green, that is, the original ground color in the handwriting region Y on the handwriting board is red and the color of the writing font is green. After the reset key 70 is triggered, the whole handwriting region Y throughout the handwriting board appears the red color displayed by the first forbidden band, and all the originally green fonts written on the handwriting region Y of the handwriting board are all changed to red, that is, the touch written contents are eliminated, so that the whole handwriting region Y is restored to the state before writing.

Further, as shown in FIG. 8, the handwriting board according to the embodiments of the disclosure is further disposed with an erasing key 80 thereon, or the handwriting board according to the embodiments of the disclosure is configured to display an erasing key 80. The forbidden band of the photonic crystal layer 21 in the region corresponding to the handwriting touch position is a second forbidden band, and the forbidden band of the photonic crystal layer 21 in the region other than that corresponds to the handwriting touch position is a first forbidden band. The handwriting board is divided into a plurality of sub-regions thereon, after the erasing key 80 is triggered, the controller 40 is further used to control the filter driving circuit 22 to drive a change of the state of the photo-dielectric 23 of the photonic crystal layer 21 in the sub-region corresponding to the handwriting touch position so that the forbidden bands of the photonic crystal layer 21 in the sub-region is the first forbidden band. Alternatively, after the erasing key 80 is triggered, the controller 40 is further used to control the filter driving circuit 22 to drive a change of the state of the photo-dielectric 23 of the photonic crystal layer 21 in the region corresponding to the handwriting touch position so that the forbidden band of the photonic crystal layer 21 in the region corresponding to the handwriting touch position is the first forbidden band.

After handwriting is input in the handwriting region Y of the handwriting board, the part of the handwritten contents to be erased may be erased by triggering the erasing key 80. For example, the entire handwriting region Y is divided into a plurality of sub-regions. After the erasing key 80 is triggered, the sub-region where the handwritten content to be erased is located is selected by touching. When any position in the sub-region is touched, the controller 40 controls the filter driving circuit 22 to drive a change of the state of the photo-dielectric 23 of the photonic crystal layer 21 corresponding to the sub-region where the touched position is located so that the forbidden band of the photonic crystal layer 21 in the sub-region is the first forbidden band. That is, the handwritten contents in the sub-region are erased. When the handwritten contents in a plurality of sub-regions need to be cleared, the operations of triggering the erasing key 80 and then sequentially touching and selecting the plurality of sub-regions may be performed many times so as to sequentially clear the handwritten contents in the plurality of sub-regions.

Alternatively, after the erasing key 80 is triggered, the filter driving circuit 22 is controlled by the controller 40 to drive a change of the physical state of the photo-dielectric 23 of the photonic crystal layer 21 at the corresponding touch position in the handwriting region Y, so that the forbidden band of the photonic crystal layer 21 at the corresponding touch position is the first forbidden band. In this way, after the erasing key 80 is triggered, the writing color at the finger touch position is converted to be the same color as the ground color of the handwriting region Y. The handwritten contents to be erased are erased following the moving track of the finger touch. In the case that only few contents need to be erased on the handwriting board or the locations where the erasing is needed are relatively scattered, it is preferable to use the way of directly touching and erasing with a finger.

Figure 9:
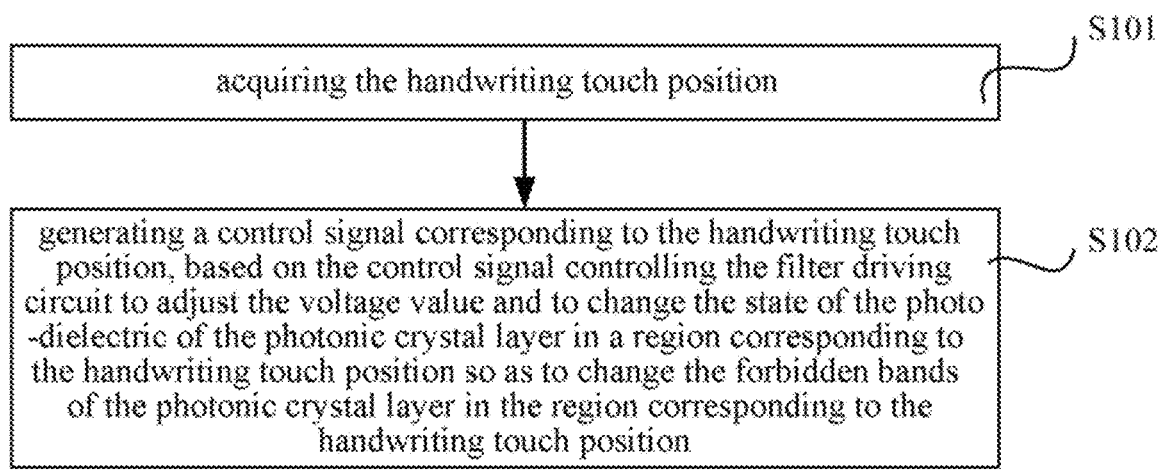
FIG. 9 is a first flow chart of a control method of a handwriting board provided by an embodiment of the disclosure.

In another aspect, the embodiments of the disclosure provide a control method of the handwriting board according to any of the embodiments as mentioned above, which, as shown in FIG. 9, comprises:

S101 acquiring the handwriting touch position; and

S102 generating a control signal corresponding to the handwriting touch position, based on the control signal controlling the filter driving circuit 22 to adjust the voltage value and to change the state of the photo-dielectric 23 of the photonic crystal layer 21 in the region corresponding to the handwriting touch position so as to change the forbidden bands of the photonic crystal layer 21 in the region corresponding to the handwriting touch position.

By first acquiring the handwriting touch position and then generating a control signal corresponding to the handwriting touch position, based on the control signal controlling the filter driving circuit 22 to adjust the voltage values of the first electrode 221 and the second electrode 222 and using the voltage difference between the first electrode 221 and the second electrode 222 to change the state of the photo-dielectric 23 of the photonic crystal layer 21 in the region corresponding to the handwriting touch position so as to change the forbidden bands at the position, a color display corresponding to the changed forbidden band appears at the handwriting touch position.

As an example, as shown in FIG. 10, before acquiring the handwriting touch position and a control signal corresponding to the handwriting touch position, the control method further comprises:

S201 generating a control signal, and controlling the filter driving circuit 22 to determine the voltage value and to drive a change of the state of the photo-dielectric 23 in the photonic crystal layer 21 so that the forbidden bands of the photonic crystal layer 21 are the first forbidden band.

By generating the corresponding control signal, and based on the control signal controlling the first electrode 221 of the filter driving circuit 22 to be applied a same voltage and the second electrode 222 of the filter driving circuit 22 to be also applied a same voltage, to drive a change of the state of the photo-dielectric 23 in the photonic crystal layer 21, the forbidden bands of the photonic crystal layer 21 are in the same forbidden band due to the same voltage differences at various positions on the handwriting board and the same states of the photo-dielectric 23 in the photonic crystal layer 21. In this case, the handwriting board displays a same ground color having the same color.

Further, as shown in FIG. 8, the handwriting board is disposed with a writing color switching key 90 thereon, or the handwriting board is configured to display a writing color switching key 90. The controlling method further comprises:

S301 acquiring a control signal of the selected or default writing color, or after the writing color switching key 90 is triggered, acquiring a control signal of the selected writing color after the switching; and S302 acquiring the handwriting touch position, and controlling the filter driving circuit 22 to adjust the voltage value and to change the state of the photo-dielectric 23 of the photonic crystal layer 21 in the region corresponding to the handwriting touch position so that the forbidden band of the photonic crystal layer 21 in the region corresponding to the handwriting touch position is changed into a forbidden band displaying the selected or default writing color.

The handwriting board may have at least two selectable writing colors. First, the controller 40 acquires a control signal of the writing color that is selected by the user or is default. Alternatively, after the writing color switching key 90 is triggered, the writing color switching key 90 provides a control signal of the writing color for the controller 40. Then, the controller 40 acquires the handwriting touch position, and controls the filter driving circuit 22 to adjust the voltage value and to change the state of the photo-dielectric 23 of the photonic crystal layer 21 in the region corresponding to the handwriting touch position, so that the forbidden band of the photonic crystal layer 21 in the region corresponding to the acquired handwriting touch position is changed into a forbidden band displaying the selected or default writing color, thereby appearing the selected or default writing color at the handwriting touch position.

Further, as shown in FIG. 8, the handwriting board is further disposed with a color switching key 60 thereon, or the handwriting board is configured to display a color switching key 60, the forbidden band of the photonic crystal layer 21 in the region corresponding to the handwriting touch position is a second forbidden band, and the forbidden band of the photonic crystal layer 21 in the region other than that corresponds to the handwriting touch position is a first forbidden band. As shown in FIG. 12, the control method further comprises:

S401, after the color switching key 60 is triggered, controlling the filter driving circuit 22 to adjust the voltage value and to drive a change of the state of the photo-dielectric 23 in the photonic crystal layer 21 so that the forbidden band of the photonic crystal layer 21 in the region corresponding to the handwriting touch position is changed into the first forbidden band and the forbidden band of the photonic crystal layer 21 in the region other than that corresponds to the handwriting touch position is changed into the second forbidden band.

Before the color switching key 60 is triggered, the forbidden band of the photonic crystal layer 21 in the region corresponding to the handwriting touch position on the handwriting board is a second forbidden band, and the forbidden band of the photonic crystal layer 21 in the regions other than that corresponds to the handwriting touch position is a first forbidden band. For example, when the first forbidden band is a white display that is transmitted through the entire visible light band, and the second forbidden band is a black font display that is opaque to the entire visible light band, a display state of black font with white ground color is exhibited in the handwriting region Y on the handwriting board.

On this basis, after the color switching key 60 is triggered, the filter driving circuit 22 is controlled to adjust the voltage value so as to drive the state of the photo-dielectric 23 of the photonic crystal layer 21 to be changed so that the forbidden band of the photonic crystal layer 21 in the region corresponding to the handwriting touch position is changed into the first forbidden band, and the forbidden band of the photonic crystal layer 21 in the region other than that corresponds to the handwriting touch position is changed into the second forbidden band. The result exhibited on the handwriting board is that the ground color and the writing color of the handwriting board have been interchanged, and the display state in the handwriting region Y on the handwriting board is changed to a white font display with black ground color.

Further, as shown in FIG. 8, the handwriting board is further disposed with a reset key thereon 70, or the handwriting board is configured to display a reset key 70, the forbidden band of the photonic crystal layer 21 in the region corresponding to the handwriting touch position is a second forbidden band, and the forbidden band of the photonic crystal layer 21 in the region other than that corresponds to the handwriting touch position is a first forbidden band. As shown in FIG. 13, the control method further comprises:

S501, after the reset key 70 is triggered, controlling the filter driving circuit 22 to adjust the voltage value and to drive a change of the state of the photo-dielectric 23 in the photonic crystal layer 21, so that the forbidden bands of the photonic crystal layer 21 are all the first forbidden band.

Before the reset key 70 is triggered, the forbidden band of the photonic crystal layer 21 in the region corresponding to the handwriting touch position in the handwriting region Y is a second forbidden band, and the forbidden band of the photonic crystal layer 21 in the region other than that corresponds to the handwriting touch position is a forbidden band. That is, the display ground color in the handwriting region Y is the display color corresponding to the first forbidden band, and when touch handwriting is performed in the handwriting region Y, the writing track presents the display color corresponding to the second forbidden band. After the reset key 70 is triggered, the controller 40 controls the filter driving circuit 22 to adjust the voltage value of the applied electric field so as to drive the state of the photo-dielectric 23 of the photonic crystal layer 21 to be changed so that the forbidden band of the photonic crystal layer 21 in the handwriting region Y is the first forbidden band. That is, after the reset key 70 is triggered, the color presented by the writing track in the handwriting region Y of the handwriting board is changed to the same color as the writing ground color (corresponding to the first forbidden band), thereby realizing a complete elimination and resetting of the written content.

Further, as shown in FIG. 8, the handwriting board is further disposed with an erasing key 80, or the controller is configured to display an erasing key 80, the forbidden band of the photonic crystal layer 21 in the region corresponding to the handwriting touch position is a second forbidden band, and the forbidden band of the photonic crystal layer 21 in the region other than that corresponds to the handwriting touch position is a first forbidden band.

The handwriting board is divided into a plurality of sub-regions thereon. As shown in FIG. 14, the control method further comprises:

S601, after the erasing key is triggered, controlling the filter driving circuit to adjust the voltage value and to drive a change of the state of the photo-dielectric of the photonic crystal layer in the sub-region corresponding to the handwriting touch position so that the forbidden bands of the photonic crystal layer in the sub-region is the first forbidden band.

Alternatively, as shown in FIG. 15, the control method further comprises:

S601', after the erasing key is triggered, controlling the filter driving circuit to adjust the voltage value and to drive a change of the state of the photo-dielectric of the photonic crystal layer in the region corresponding to the handwriting touch position so that the forbidden band of the photonic crystal layer in the region corresponding to the handwriting touch position is the first forbidden band.

When a writing error or the other that needs to be modified occurs during writing in the handwriting region Y of the handwriting board, the written track needs to be partially cleared. In this case, the control method according to the embodiments of the disclosure provides two erasing modes.

As an example, when the portion requiring to be erased includes a larger area, the handwriting region Y can be divided into a plurality of sub-regions, as shown in FIG. 14. After the erasing key 80 is triggered, the sub-region where the written contents to be cleared is located is selected by touch operation and any position in the sub-region is touched. That is, the filter driving circuit 22 is controlled to drive the voltage values of the first electrode 221 and the second electrode 222 corresponding to the sub-region where the touch position is located to be adjusted and to drive the state of the photo-dielectric 23 of the photonic crystal layer 21 in the sub-region corresponding to the handwriting touch position to be changed so that the forbidden band of the photonic crystal layer 21 corresponding to the sub-region is the first forbidden band, i.e., achieving the erasing of handwritten content in the sub-region.

As another example, in the case that the portions requiring to be erased are fewer and their distribution positions in the handwriting region Y are relatively dispersed, as shown in FIG. 15, after the erasing key 80 is triggered, the filter driving circuit 22 is controlled to drive the voltage values of the first electrode 221 and the second electrode 222 in the region corresponding to the handwriting touch position to be adjusted and to drive the state of photo-dielectric of the photonic crystal layer in the region corresponding to the handwriting touch position so that the forbidden band of the photonic crystal layer in the region corresponding to the handwriting touch position is the first forbidden band. That is, the writing color at position of the touch operation by finger after the erasing key 80 is triggered is converted to the same color as the ground color of the handwriting region Y, and the handwritten content to be cleared can be point-by-point and line-by-line erased along the moving track of the finger's touch.

The embodiments of the disclosure provides a handwriting board and a control method thereof, comprising: a touch structure configured to sense the handwriting touch position; a filter display structure comprising a photonic crystal layer and a filter driving circuit, the photonic crystal layer comprises a periodic defect structure of the surface and a photo-dielectric filled in the defect structure, and the filter driving circuit is configured to apply voltage to the photonic crystal layer to drive the state of the photo-dielectric in the defect structure to be changed; and a controller configured to control the filter driving circuit to drive the state of the photo-dielectric in the photonic crystal layer in the corresponding region based on the handwriting touch position to be changed, so as to change the forbidden band of the photonic crystal layer in the corresponding region. The filter display structure comprises a photonic crystal layer and a filter driving circuit, the photonic crystal layer has a periodic defect structure at the surface, and the defect structure is filled with a photo-dielectric. The controller controls the filter driving circuit to drive a change of the state of the photo-dielectric in the photonic crystal layer in the corresponding region, which allows a change of the forbidden bands of the photonic crystal layer in the corresponding region. In this way, the touch and the handwriting display of the handwriting board can be achieved by using the difference between the wavelength range of the light exiting through the photonic crystal layer at the handwriting touch position and the wavelength range of the light exiting through the photonic crystal layer at the other positions. The handwriting display achieved by changing the width state of the forbidden band of the photonic crystal layer, can improve the anti-impact ability of the handwriting board and the service life of the handwriting board without increasing the thickness of the handwriting board itself. Meanwhile, since no additional filter layer and polarizing layer structures are required to be disposed on the handwriting board, the manufacturing cost of the handwriting is reduced.

The foregoing descriptions are merely specific embodiments of the disclosure, but the protection scope of the disclosure is not limited thereto. Anyone skilled in the art may easily contemplated modifications or replacements within the technical scope disclosed in the disclosure should be included in the protection scope of the disclosure. Therefore, the protection scope of the disclosure should be subject to the protection scope of the claims.

What is claimed is:

1. A handwriting board, comprising:
   a touch structure, configured to sense a handwriting touch position;
   a filter display structure, comprising a photonic crystal layer and a filter driving circuit, wherein the photonic crystal layer comprises a periodic defect structure on surface and a photo-dielectric filled in the periodic defect structure, and the filter driving circuit is configured to apply voltage to the photonic crystal layer, so as to change a state of the photo-dielectric in the periodic defect structure; and
   a controller, configured to control the filter driving circuit to change a state of the photo- dielectric in the photonic crystal layer in a corresponding region based on the handwriting touch position, so as to change forbidden bands of the photonic crystal layer in the corresponding region.

2. The handwriting board according to claim 1, further comprising a backlight source, disposed on a side facing away from a light-exiting surface of the filter display structure and configured to provide a backlight for the handwriting board.

3. The handwriting board according to claim 1, wherein the touch structure is disposed on a light-exiting surface of the filter display structure.

4. The handwriting board according to claim 3, wherein the touch structure comprises a touch electrode and a sensing electrode which are intersected with and insulated from each other.

5. The handwriting board according to claim 1, wherein the filter driving circuit comprises a first electrode and a second electrode which are insulated from each other, the first electrode and the second electrode are separately parallel to the photonic crystal layer to form an electric field for driving the photonic crystal layer after applying a voltage thereto respectively.

6. The handwriting board according to claim 5, wherein the first electrode comprises a plurality of first sub-electrodes which are arranged in a matrix.

7. The handwriting board according to claim 1, wherein the controller is further configured to change the state of the photo-dielectric in the photonic crystal layer to bring the photonic crystal layer in a same forbidden band.

8. The handwriting board according to claim 1, further comprising a plurality of handwriting regions thereon, wherein the controller changes the state of the photo-dielectric in the photonic crystal layer corresponding to the handwriting touch position in each of the handwriting regions or the state of the photo-dielectric in the photonic crystal layer in each of the handwriting regions.

9. The handwriting board according to claim 1, wherein the handwriting board is disposed with a writing color switching key thereon, or the handwriting board is configured to display a writing color switching key; after the writing color switching key is triggered, the controller is configured to control the filter driving circuit to change the state of the photo- dielectric in the photonic crystal layer in the region corresponding to the handwriting touch position so that the forbidden band of the photonic crystal layer in the region corresponding to the handwriting touch position is changed into a forbidden band displaying the selected or default writing color.

10. The handwriting board according to claim 1, wherein the handwriting board is further disposed with a color switching key thereon, or the handwriting board is configured to display a color switching key, the forbidden band of the photonic crystal layer in the region corresponding to the handwriting touch position is a second forbidden band, and the forbidden band of the photonic crystal layer in the region other than that corresponds to the handwriting touch position is a first forbidden band; after the color switching key is triggered, the controller is further configured to control the filter driving circuit to drive a change of the state of the photo-dielectric in the photonic crystal layer so that the forbidden band of the photonic crystal layer in the region corresponding to the handwriting touch position is changed into the first forbidden band and the forbidden band of the photonic crystal layer in the region other than that corresponds to the handwriting touch position is changed into the second forbidden band.

11. The handwriting board according to claim 1, wherein the handwriting board is further disposed with a reset key thereon, or the handwriting board is configured to display a reset key, the forbidden band of the photonic crystal layer in the region corresponding to the handwriting touch position is a second forbidden band, and the forbidden band of the photonic crystal layer in the region other than that corresponds to the handwriting touch position is a first forbidden band; after the reset key is triggered, the controller is further configured to control the filter driving circuit to drive a change of the state of the photo-dielectric in the photonic crystal layer so that the forbidden bands of the photonic crystal layer are all the first forbidden band.

12. The handwriting board according to claim 1, wherein the handwriting board is further disposed with an erasing key thereon, or the handwriting board is configured to display an erasing key, the forbidden band of the photonic crystal layer in the region corresponding to the handwriting touch position is a second forbidden band, and the forbidden band of the photonic crystal layer in the region other than that corresponds to the handwriting touch position is a first forbidden band;
the handwriting board is divided into a plurality of sub-regions thereon, after the erasing key is triggered, the controller is further configured to control the filter driving circuit to drive a change of the state of the photo-dielectric of the photonic crystal layer in the sub-region corresponding to the handwriting touch position so that the forbidden bands of the photonic crystal layer in the sub-region is the first forbidden band;
or, after the erasing key is triggered, the controller is further configured to control the filter driving circuit to drive a change of the state of the photo-dielectric of the photonic crystal layer in the region corresponding to the handwriting touch position so that the forbidden band of the photonic crystal layer in the region corresponding to the handwriting touch position is the first forbidden band.

13. A control method of a handwriting board, wherein the handwriting board comprises:
a touch structure, configured to sense the handwriting touch position;
a filter display structure, comprising a photonic crystal layer and a filter driving circuit, the photonic crystal layer comprises a periodic defect structure of the surface and a photo-dielectric filled in the periodic defect structure, and the filter driving circuit is configured to apply voltage to the photonic crystal layer, so as to change a state of the photo-dielectric in the periodic defect structure; and a controller, configured to control the filter driving circuit to change a state of the photo-dielectric in the photonic crystal layer in a corresponding region based on the handwriting touch position so as to change forbidden bands of the photonic crystal layer in the corresponding region, and the control method comprises:
acquiring the handwriting touch position; and
generating a control signal corresponding to the handwriting touch position, based on the control signal controlling the filter driving circuit to adjust the voltage value and to change the state of the photo-dielectric of the photonic crystal layer in a region corresponding to the handwriting touch position so as to change the forbidden bands of the photonic crystal layer in the region corresponding to the handwriting touch position.

14. The control method of the handwriting board according to claim 13, wherein before the acquiring the handwriting touch position and a control signal corresponding to the handwriting touch position, the method further comprises:
generating a control signal, and controlling the filter driving circuit to determine the voltage value and to change the state of the photo-dielectric in the photonic crystal layer so that the forbidden bands of the photonic crystal layer is the first forbidden band.

15. The control method of the handwriting board according to claim 13, wherein the handwriting board is disposed with a writing color switching key thereon, or the handwriting board is configured to display a writing color switching key, the method further comprises:
acquiring a control signal of the selected or default writing color, or after the writing color switching key is triggered, acquiring a control signal of the selected writing color after the switching; and
acquiring the handwriting touch position, and controlling the filter driving circuit to adjust the voltage value and to change the state of the photo-dielectric of the photonic crystal layer in the region corresponding to the handwriting touch position so that the forbidden band of the photonic crystal layer in the region corresponding to the handwriting touch position is changed into a forbidden band displaying the selected or default writing color.

16. The control method of the handwriting board according to claim 13, wherein the handwriting board is further disposed with a color switching key thereon, or the handwriting board is configured to display a color switching key, the forbidden band of the photonic crystal layer in the region corresponding to the handwriting touch position is a second forbidden band, and the forbidden band of the photonic crystal layer in the region other than that corresponds to the handwriting touch position is a first forbidden band, the method further comprises:
after the color switching key is triggered, controlling the filter driving circuit to adjust the voltage value and to change the state of the photo-dielectric in the photonic crystal layer so that the forbidden band of the photonic crystal layer in the region corresponding to the handwriting touch position is changed into the first forbidden band and the forbidden band of the photonic crystal layer in the region other than that corresponds to the handwriting touch position is changed into the second forbidden band.

17. The control method of the handwriting board according to claim 13, wherein the handwriting board is further disposed with a reset key thereon, or the handwriting board is configured to display a reset key, the forbidden band of the photonic crystal layer in the region corresponding to the handwriting touch position is a second forbidden band, and the forbidden band of the photonic crystal layer in the region other than that corresponds to the handwriting touch position is a first forbidden band, the method further comprises:

after the reset key is triggered, controlling the filter driving circuit to adjust the voltage value and to change the state of the photo-dielectric in the photonic crystal layer, so that the forbidden bands of the photonic crystal layer are all the first forbidden band.

18. The control method of the handwriting board according to claim 13, wherein the handwriting board is further disposed with an erasing key, or the controller is configured to display an erasing key, the forbidden band of the photonic crystal layer in the region corresponding to the handwriting touch position is a second forbidden band, and the forbidden band of the photonic crystal layer in the region other than that corresponds to the handwriting touch position is a first forbidden band;

the handwriting board is divided into a plurality of sub-regions thereon, the method further comprises:

after the erasing key is triggered, controlling the filter driving circuit to adjust the voltage value and to change the state of the photo-dielectric of the photonic crystal layer in the sub- region corresponding to the handwriting touch position so that the forbidden bands of the photonic crystal layer in the sub-region is the first forbidden band;

or, the method further comprises:

after the erasing key is triggered, controlling the filter driving circuit to adjust the voltage value and to change the state of the photo-dielectric of the photonic crystal layer in the region corresponding to the handwriting touch position so that the forbidden band of the photonic crystal layer in the region corresponding to the handwriting touch position is the first forbidden band.

* * * * *